United States Patent [19]

DePauw et al.

[11] Patent Number: 4,776,153
[45] Date of Patent: Oct. 11, 1988

[54] AUTOMATIC HEIGHT CONTROL FOR A LATERALLY PIVOTED HARVESTER HEADER

[75] Inventors: Richard A. DePauw, Moline; Robert P. Spangler, Hampton; William R. Brown, East Moline, all of Ill.; Edward J. Hengen, South Bend, Ind.

[73] Assignee: Deere & Company, Moline, Ill.

[21] Appl. No.: 833,932

[22] Filed: Feb. 27, 1986

[51] Int. Cl.⁴ .................................... A01D 67/00
[52] U.S. Cl. ................................ 56/10.2; 56/208; 56/DIG. 15
[58] Field of Search ................... 56/208, 10.2, 10.4, 56/DIG. 15

[56] References Cited

U.S. PATENT DOCUMENTS

| | | |
|---|---|---|
| 3,675,404 | 7/1982 | Izakson . |
| 3,731,470 | 5/1973 | Cornish et al. . |
| 3,975,890 | 8/1976 | Rodgn ................................ 56/208 |
| 3,981,125 | 9/1976 | Kerber et al. . |
| 4,211,057 | 7/1980 | Doughuty et al. . |
| 4,249,365 | 2/1981 | Hubbard et al. . |
| 4,266,391 | 5/1981 | McDuffie et al. ............. 56/208 X |
| 4,266,395 | 5/1981 | Basham . |
| 4,332,126 | 6/1982 | VanAuwelaer et al. . |
| 4,487,004 | 12/1984 | Kejr . |
| 4,527,381 | 7/1985 | Mann . |
| 4,541,229 | 9/1985 | Elijah ........................... 56/208 X |
| 4,612,757 | 9/1986 | Halls et al. ..................... 56/208 X |
| 4,641,490 | 2/1987 | Wynn et al. ..................... 56/10.2 |

OTHER PUBLICATIONS

Hart-Carter sales leaflet-"Field Tracker Tilt Head Attachment".
ASAE Paper No. 85-1581 "Lateral Float for Combine Headers".

Primary Examiner—George A. Suchfield

[57] ABSTRACT

In a combine harvester, an array of ground engaging skid shoes or feelers spans the header platform and is divided into right- and left-hand groups, each group associated with a position sensor switch. Each switch transmits to an electrohydraulic control system, a signal representative of the relative position of the skid shoe closest to the ground in its half of the platform. The combined left- and/or right-hand signals are transduced to control platform vertical adjustment and lateral tilt automatically. In one embodiment, a pair of lift cylinders, acting in unison, control platform elevation while a third cylinder is dedicated to tilt control. In other embodiments, paired lift cylinders are controllable independently, to provide both height and tilt control. Supporting the feeder conveyor lower shaft and the header main drive shaft in the laterally pivotable lower forward portion of the feederhouse permits direct transfer of crop material from the platform auger to the feederhouse conveyor and also simplifies header drive arrangements.

26 Claims, 9 Drawing Sheets

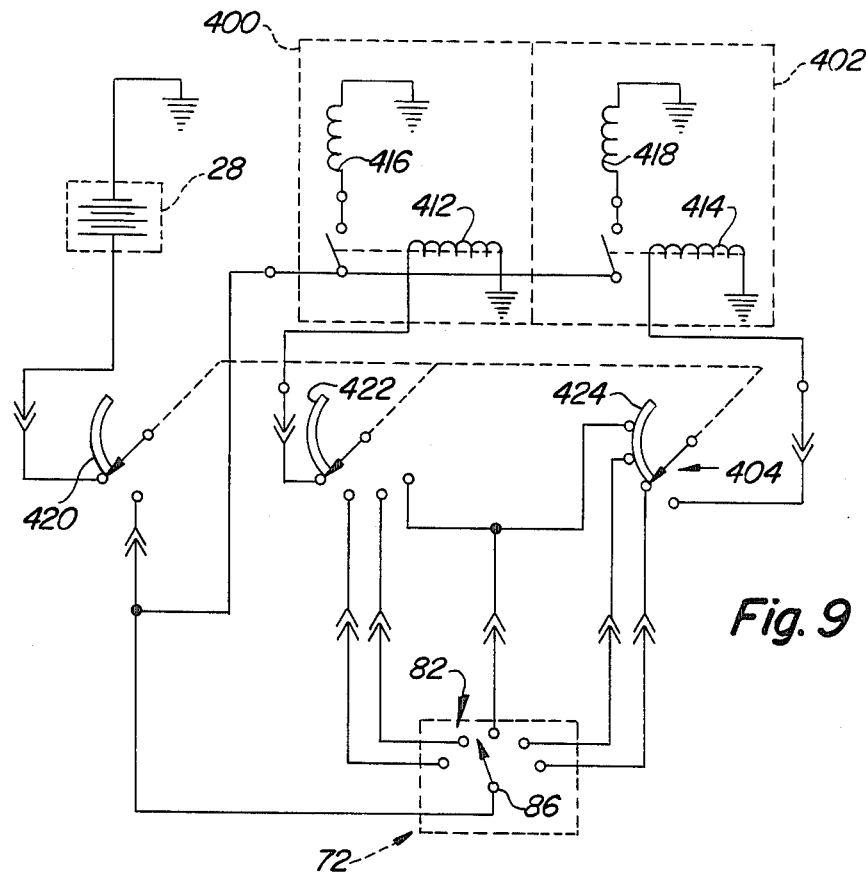
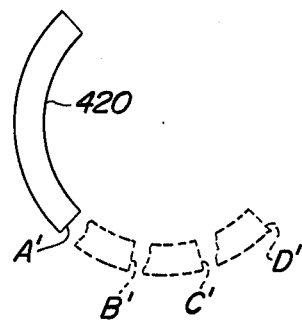
Fig. 10
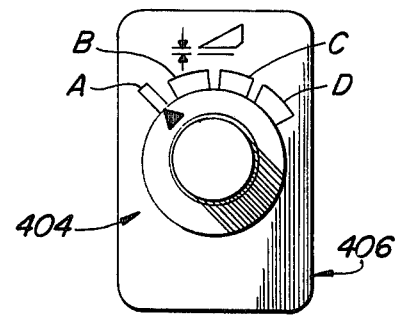
Fig. 11

AUTOMATIC HEIGHT CONTROL FOR A LATERALLY PIVOTED HARVESTER HEADER

BACKGROUND OF THE INVENTION

The invention concerns automatic operating height control for the gatherer portion of a harvester header and, more particularly, control for a gatherer or platform which may pivot or oscillate in relation to the harvester body in a generally upright transverse plane.

In conventional harvesters, the gatherer or cutting platform is part of a header which is carried ahead of the combine body. Operating height is adjusted by pivoting the header about a fixed transverse axis by means of a pair of hydraulic lift cylinders. Operating height may be controlled manually or automatically but at any given height setting, the gatherer is fixed in relation to the harvester body and its lateral tilt or inclination in an upright transverse plane will be determined or gauged by the harvester drive wheels, spaced typically eight or ten feet behind the gatherer. Usually, the gatherer length is much greater than the harvester wheel spacing and so the remoteness of the harvester wheels, especially from the lateral extremities of the gatherer, makes them unreliable as a gauging means. The combination of uneven ground and variations in the combine structure including, for example, tire pressure, can easily result in an undesirable lateral tilt and an unacceptable difference in effective operating height between one end of the gatherer and the other. This is especially undesirable in a wide platform when harvesting crops such as soybeans when, to minimize crop loss, the cutterbar must be set close to the ground. This problem is common to both regular or level land combines and the conventional hillside combine. In the latter, the harvester body may be maintained automatically level with respect to sloping terrain, but the drive axle (front wheels), conforming to the ground surface behind the gatherer, still determines the lateral tilt attitude adopted by the gatherer with respect to the ground surface.

Given the continuing advances in specific capacity of combine separators and cleaning arrangements and the introduction of automatic controls extending operator capability, harvester working rate is still too frequently limited by gatherer capacity and particularly by the gatherer width factor. Thus, there is a strong and continuing interest for improving the lateral tilt control of gatherers so as to make possible more precise control, and hence, improved efficiency of operation, and particularly to make efficient use of wider platforms more feasible.

It is well known, of course, to transfer the gauging of a harvester gatherer from the harvester body wheels to the gatherer itself, mounting the gatherer so that it may float vertically and tilt or oscillate in a transverse upright plane. Skid shoes are placed on the gatherer to gauge and control operating height at one or more points along the length of the gatherer. In more recent years, as the need for wider combine harvester gatherers has developed, there have been attempts to apply this passive lateral floating solution to the field of combine harvester gatherers. For example, Izakson, in U.S. Pat. No. 3,675,404, discloses a combine cutting platform pivoted on a ball joint and counterbalanced so that he may rely on ground-engaging skid shoes to maintain the cutting platform approximately parallel to the ground. Where ground levels and contours change rapidly, the high inertia and resistance to lateral pivoting movement of extremely wide platforms places undesirable operational limitations on this approach. Basham, in U.S. Pat. No. 4,266,395, discloses a cutting platform pivoted to a feederhouse for pivoting about a fore-and-aft longitudinal axis but uses a manually controlled hydraulic cylinder rather than ground-engaging shoes for control. Effective use of this arrangement may place unacceptable additional demands on the gcombine operator's skill and concentration.

A further disadvantage of the lateral tilt control improvements offered by Basham and others is the requirement for an adapter frame or box between the feederhouse and the gatherer platform. In some cases, this spaces the delivery point of the gatherer conveyor so far from the reception point of the feederhouse conveyor that an intermediate conveyor element, such as a transverse horizontally rotating beater, must be introduced, adding undesirably to cost, weight and complexity of the header arrangement.

Another possible solution to the problem of wide platform control is exemplified by Kejr (U.S. Pat. No. 4,487,004). The platform is split into two or more sections hinged together about generally fore-and-aft axes so that the platform may flex to follow ground surface contours, possibly assisted by automatic height control means.

A recent improvement proposed by Hart-Carter (Field Tracker sales folder 1984) adds automatic lateral tilt control in a structure similar to Basham's. An adapter box between the conventional feederhouse and cutting platform provides a fore-and-aft pivot beneath the lower end of the feederhouse and an intermediate feeder beater between the gatherer and feederhouse. Oscillation about this pivot is controlled by a single hydraulic cylinder above the feederhouse. Height of the gatherer above the ground is sensed by a pair of sensors, one at each end of the gatherer and each driving a potentiometer. Signals from the potentiometers are compared by a microprocessor to provide a tilt control for maintaining equal height at the sensed extremities of the gatherer. A disadvantage of this arrangement is that it senses at only two points towards the opposite extremities of the gatherer and takes no account of ground surface variations along its length. This limits the preciseness of control of means operating height at the particularly, if applied to a wide rigid platform, raises the risk of running intermediate portions of the gatherer into the ground.

The conventional floating flexible cutterbar of a combine cutting platform, with or without automatic height control, is designed to conform to field surface contour and is particularly useful in harvesting soybeans where it is necessary to operate with the cutterbar as close to the ground as possible to minimize crop loss. Without automatic height control, the flexibility of the cutterbar gives it an inherent, limited capability to compensate for platform lateral tilt. However, in general, the float range so far found feasible for the flexible cutterbar is substantially less than the desirable range indicated by the degree of lateral tilt to which gatherers are frequently subjected. In some of the known flexible cutterbar arrangements with automatic height control, height sensors are spaced along the length of the cutterbar. However, the control and sensing system is unable to discriminate between height variations in general and effective lateral tilt of the gatherer. The system is always controlled by the sensor at the position on the cutterbar closest to the ground so that a substantial lateral tilt of the platform will cause a sensor close to the low end of the platform to generate a raise signal, the response to which is to raise the whole platform as a body rather than correct the tilt.

SUMMARY OF THE INVENTION

Accordingly, it is an object of the invention, to provide in a harvester gatherer portion, an automatic control of gatherer operating height above the ground surface which provides specific compensation for relative lateral tilt of the gatherer relative to a plurality of laterally spaced selected ground surface portions which, in operation, are adjacent the gatherer lower or under surfaces.

Another object is to provide an automatic operating height control system providing specific compensation for effective lateral tilt for a combine cutting platform embodying a floating flexible cutterbar.

These objects may be achieved by spacing along the length of the gatherer a plurality of ground-engaging or ground referenced height sensing elements and adopting a control system which groups these sensing elements into two or more response groups. Each group may cover a selected portion of the span of the gatherer. The control system may be arranged to respond both to individual signals (raise or lower) from the respective spans and to combinations of signals from two or more spans to actuate positioning devices for tilting and raising or lowering the header.

In a preferred embodiment, the gatherer is carried by the mobile body of the harvester or a gatherer support member so as to be free to oscillate or pivot in a generally upright transverse plane and have both its vertical and its lateral tilt dispositions controlled automatically by a plurality of linear actuators comprising at least a pair of actuators extending between the harvester body and the gatherer support member. Left- and right-hand sensor groups, each including a plurality of sensors, substantially span the left- and right-hand halves of the gatherer. A control system, such as an electrohydraulic control system, discriminates in its response to signals from the respective sensor groups so as to actuate a linear actuator or actuators as appropriate to raise or lower the respective left- or right-hand span of the gatherer. The members within each sensor group may be associated in a lost motion arrangement such that the control system is always responsive to the sensor element at the gatherer portion closest to the ground, so that only one transducer or switch is needed to transmit the signals from each sensor group.

In one preferred embodiment, freedom for oscillation of the gatherer in a transverse upright plane is provided by a pivot with a fore-and-aft axis in the coupling between the gatherer and/or platform and the combine body. Preferably, the pivot is disposed towards the lower side of a crop material conveying channel, at the junction between the gatherer or platform and the combine body. In keeping with the invention, the gatherer may be pivotably connected, as described above, to the inlet end of a conveyor assembly such as a feederhouse extending forward from the combine body and mounted for pivoting relative to the body about a transverse horizontal axis.

Vertical adjustment of the conveyor assembly and the gatherer carried by it is made by means of a pair of linear actuators such as hydraulic cylinders extending between the combine body and the conveyor assembly.

A third linear actuator connected between the conveyor assembly and the gatherer is operable to tilt or oscillate the gatherer about the fore-and-aft extending pivot axis. Suitable control logic controls actuation of the three linear actuators to raise and lower and/or laterally tilt the gatherer.

In an alternative embodiment, a pair of linear actuators may extend between the harvester body and connecting points on the pivoting structure of the gatherer spaced one on each side of the pivot axis. Actuation of the linear actuators is differentiated and/or coordinated to raise and lower and/or tilt the gatherer according to signals from respective left- and right-hand sensor groups of the gatherer so that a third or tilt actuator is not needed.

It is a feature of the invention that headers structured according to the invention may employ, as transducers for relative positioning of the ground-engaging shoes in the sensor groups, simple single-pole, double-throw position sensor switches directly coupled to or driven by the sensors. The switch closed positions correspond to raise and lower signals respectively. An intermediate open or neutral position, (defining a "dead band") is reached when the platform is at its selected operating height. The header arrangement where both lift and tilt control is provided by a parallel pair of linear actuators, such as hydraulic cylinders, is amenable to a simple control circuitry in which each of the laterally defined right-and left-hand sensor groups are associated with an essentially independent electrohydraulic system controlling its respective linear actuator. The two systems may, of course, share a common source of hydraulic and electrical power and pressure relief provision may be made in both directions between the hydraulic cylinder circuits to avoid overload at the limits of the tilt range. The position sensor switches require only a single pair of output contacts. The header will be raised or lowered in response to a pair of like signals (raise or lower) from the transducers. Tilt will occur in response to either combined, but opposite, signals from the two sensor switches or to a single signal from either one of the sensor switches.

In a header arrangement using separate actuators for height control and tilt control, the position sensor switches are provided with two sets of output contacts, one for the height control function and one for the tilt function. In a simple and acceptable circuit configuration for a header having right-hand and left-hand groups of sensors, each spanning significant portions of their respecrive sides of the gatherer and feeding respective right- and left-hand sensor switches, the switches may be connected in series with respect to both the height control and the tilt control functions. Then, height control actuation requires a pair of like signals while tilt actuation requires a combination of opposite signals from the two switches. This circuit configuration may be advantageously modified by using a parallel, rather than series, connection of switches between the power source and the tilt actuator. A simple logic circuit interposed between the tilt contacts of the position sensor switches and the tilt actuator interrupts power to the tilt actuator when a pair of like and, for the tilt actuator, conflicting signals are received from the sensors. (Such signals, of course, properly signal a height change for the header). This circuitry has the advantage that while a pair of like signals are still required for height actuation, there will be a tilt actuation in response to a single independent signal from either side of the gatherer or to a combination of opposie signals. (Opposite signals, raise on one side and lower on the other, are, of course, the normal condition calling for tilt actuation response).

In another alternative embodiment, also employing only two linear actuators, freedom of the gatherer to oscillate in a generally upright transverse plane is provided by carrying the gatherer assembly on a conveyor housing assembly (pivotably connected to the harvester body for vertical adjustment about a transverse axis) which is torsionally flexible responsive to differential action of the pair of laterally spaced linear actuators, connected between the harvester body and opposite sides of the conveyor housing or gatherer, adjacent the lower receiving end of the conveyor housing.

It is a feature of gatherer control arrangements, according to the invention, that transfer of crop material from the gatherer to the harvester body may be by way of a conveyor assembly extending between the gatherer and the harvester body which includes a conveyor element extending within a conveyor housing. A forward or receiving end of the conveyor element is supported by a forward portion of the conveyor housing which is pivotably connected to the main conveyor housing for oscillation in a generally upright transverse plane with respect to the main conveyor housing. Thus, at the point of transfer of crop material from the gatherer lateral conveyor to the feederhouse conveyor element, relative disposition of the conveyor element is fixed so that material handling efficiency is not affected by oscillation of the gatherer.

Also in keeping with the invention, power for components of the harvester header, including the gatherer portion, may be transmitted from the harvester body to a transverse shaft carried in fixed relation to the gatherer so that it oscillates with it. Relative oscillation between gatherer and combine body is easily absorbed in slight twisting in the (typically) belt or chain drive which transmit power between them so that drive design is simplified.

BRIEF DESCRIPTION OF THE DRAWINGS

FIG. 9 is a simplified schematic of a part of the electrical circuitry of the combine concerned directly with automatic control of the operating height of the header.

FIG. 10 is a diagram representative of a wiper of one of the poles of the three-pole, four-position rotary switch used for selecting operating height set point shown in its "off" position and, in phantom outline, its disposition in each of its other three settings.

FIG. 11 shows, diagrammatically, the control knob of the rotary selector switch at the operator station and the function indicating decal associated with it.

DESCRIPTION OF THE PREFERRED EMBODIMENT

Figure 1:
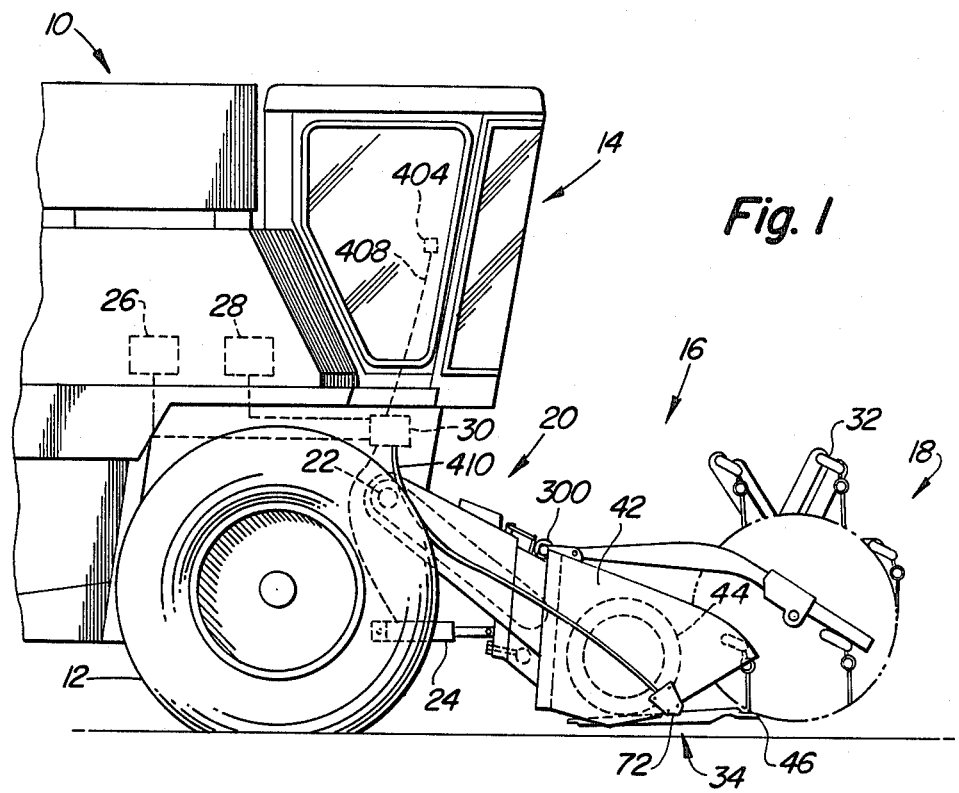
FIG. 1 is a right-hand side elevation of the forward portion of a combine harvester embodying the invention.

The invention is embodied in a self-propelled combine harvester, the forward portion of which is shown in FIG. 1. A mobile body 10 is supported above the ground on a pair of forward drive wheels 12 and includes a forward operator station 14 and carries a forward mounted header 16.

In this embodiment, a forward crop gatherer unit is exemplified by a grain cutting platform 18 laterally centered on and carried by a feederhouse 20 and forming part of the header 16 which is coupled to the combine body for pivoting about a transverse pivot axis 22, as is conventional. Vertical adjustment of the header 16 is effected by a pair of side-by-side, single-acting hydraulic cylinders 24 actuation of which is dependent upon conventional sources of hydraulic and electrical power 26 and 28, respectively, and on an electrohydraulic control assembly 30 all carried in the combine body 10 and shown only in simplified diagrammatic form in FIG. 1. The control arrangement, which also provides lateral or tilt control of the platform about a fore-and-aft axis, will be described in detail below.

Figure 4:
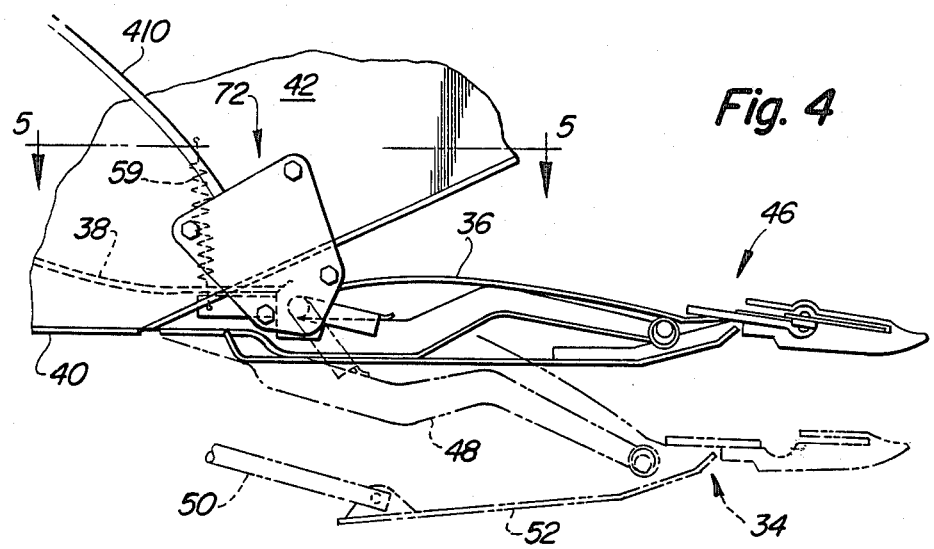
FIG. 4 is a further enlarged, partial view of the right-hand end of a portion of the flexible cutterbar arrangement of the combine header platform, including the right-hand sensor shaft assembly and position sensor switch.
Figure 5:
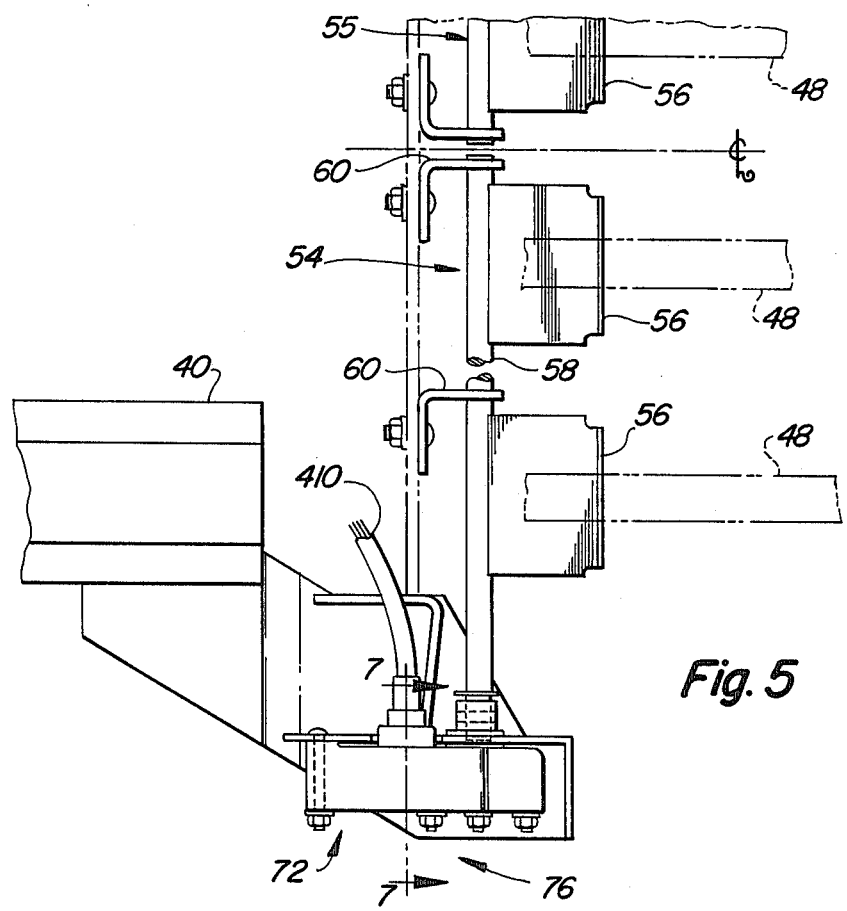
FIG. 5 is a partial overhead view of the right-hand sensor shaft assembly and the right-hand position sensor switch taken on line 5—5 of FIG. 4.

Looking at the gathering unit cutting platform 18 in more detail and referring particularly to FIGS. 1, 4 and 5, the structure is generally conventional except for the provisions for the platform automatic height and lateral control device of the present invention. An adjustable gatherer reel 32 helps to control the standing crop for engagement by a conventional floating flexible cutterbar 34 as the combine advances over a field. Severed crop passes rearwardly over a transition plate 36 to a fixed floor portion 38. The body or main portion of the gatherer unit 18 is given rigidity by a gatherer frame, a representative portion of which is indicated by the numeral 40, (FIGS. 4 and 5). Opposite end sheets 42 provide support for a platform auger 44 which converges crop material to the center of the platform for reception by the feederhouse 20 and delivery for processing to the combine body 10.

The form and function of floating flexible cutterbars is well known and that of the cutterbar 34 of the present embodiment will be described only briefly (see especially, FIGS. 4 and 5). More complete descriptions are available elsewhere, for example in U.S. Pat. No. 3,982,383 Mott, also assigned to the assignee of the present invention. Crop is severed by the knife 46 which is floatingly carried for vertical movement relative to the gatherer floor 38 by a linkage system including a plurality of transversely spaced stop arms 48 and push links 50. A series of side-by-side, ground-engaging skid shoes 52 serve as feelers or ground followers and provide the external input for determining a fluctuating vertical offset between the adjacent portion of the knife 46 and the platform floor 38 as the combine advances.

A pair of opposite right- and left-hand sensing shaft assemblies 54, 55, respectively, together substantially span the lateral extent of the platform 18, their inner ends approaching one another close to the center of the platform. The sensing shaft assemblies 54, 55, seen best in FIGS. 4 and 5, are, in effect, rotatable sensor elements and their rotational position relative to the fixed portion of the gatherer or gatherer frame 40 is representative of the vertical offset of the knife 46 relative to the platform floor 38. The right- and left-hand sensing shaft assemblies 54, 55 are essentially mirror images of one another and only one of them need be described.

The right-hand sensor shaft assembly 54 includes a plurality of transversely spaced pads 56 rigidly attached to a shaft 58, the shaft being journalled in brackets 60 rigidly attached to the gatherer frame 40. The sensing shaft assembly 54 is biased by a tension spring 59 so that the sensor pads 56 bear on the stop arms 48. In that the pads 56 are rigidly attached to the shaft 58, the shaft position, and hence, the signal which it originates, will be determined at any one time by the uppermost of the stop arms 48, responsive to engagement by one or more of the skid shoes 52 with a portion of the ground or field surface relatively higher than that engaged by any other of the skid shoes 52.

The sensing shaft assemblies 54, 55 are each coupled with and drive directly a position sensor switch assembly 72, drivably carried on the outer ends of their respective shafts. Each switch assembly 72 is held against rotation relative to the frame 40 by the attachment of its case 74 to a bracket 76 carried by the frame member 40. Each psition sensor switch assembly 72 is of the type described in detail in U.S. Pat. No. 4,332,126 Van Auwelaer et al (sharing a common assignee with the present invention and hereby incorporated by reference) and will be described only briefly here.

Figure 7:
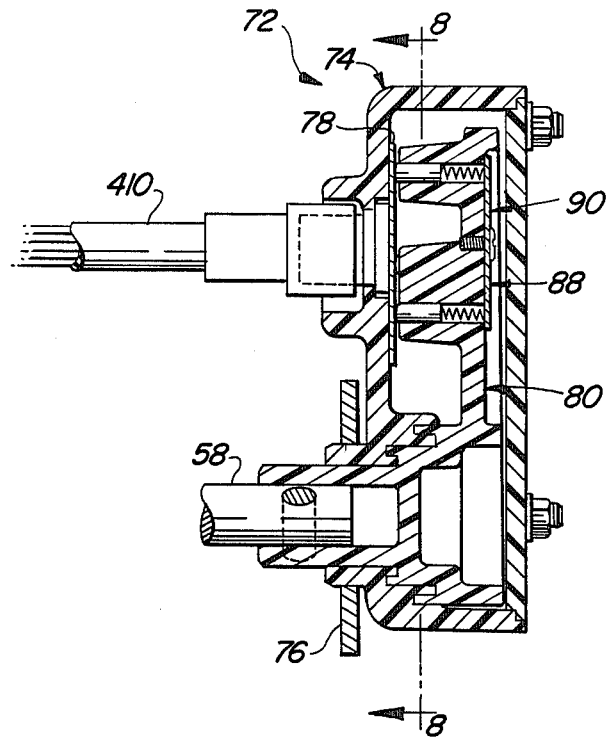
FIG. 7 is a cross-sectional view approximately on line 7—7 of FIG. 5 showing details of the right-hand position sensor switch assembly.
Figure 8:
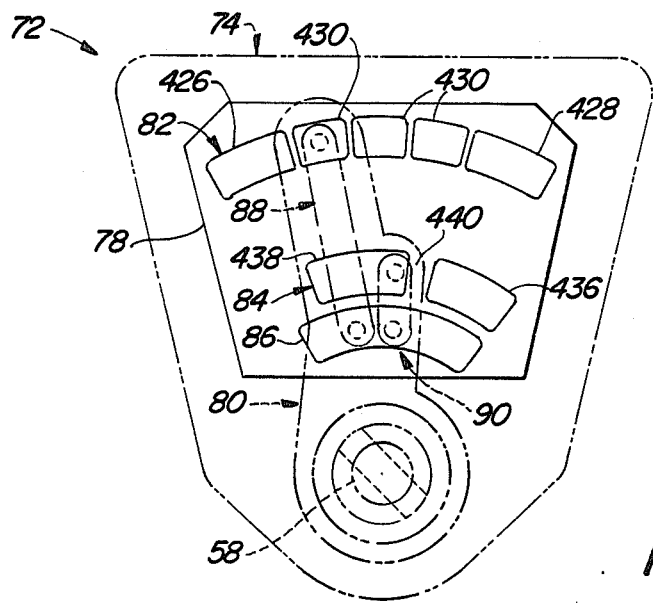
FIG. 8 is a partial simplified right-hand side elevation of the right-hand position sensor switch assembly.

Fixed inside the case 74, and seen best in FIGS. 7 and 8, is a circuit board assembly 78 which is swept by a wiper arm assembly 80 drivably and coaxially carried by the rockshaft 58. The circuit board assembly 78 includes two concentric segmented planar arrays of output contacts 82, 84 and a single common or input contact 86, the input and output contacts being electrically connectible by brush assemblies 88, 90 carried by the wiper arm assembly 80. Preferably the connection of the switch body 74 to the bracket 76 is slotted, permitting rotational adjustment of the switch body. This adjustment can be used to compensate for manufacturing variations, to match the left- and right-hand portions of the system, or to "shift" the operating ranges of the system.

Figure 2:
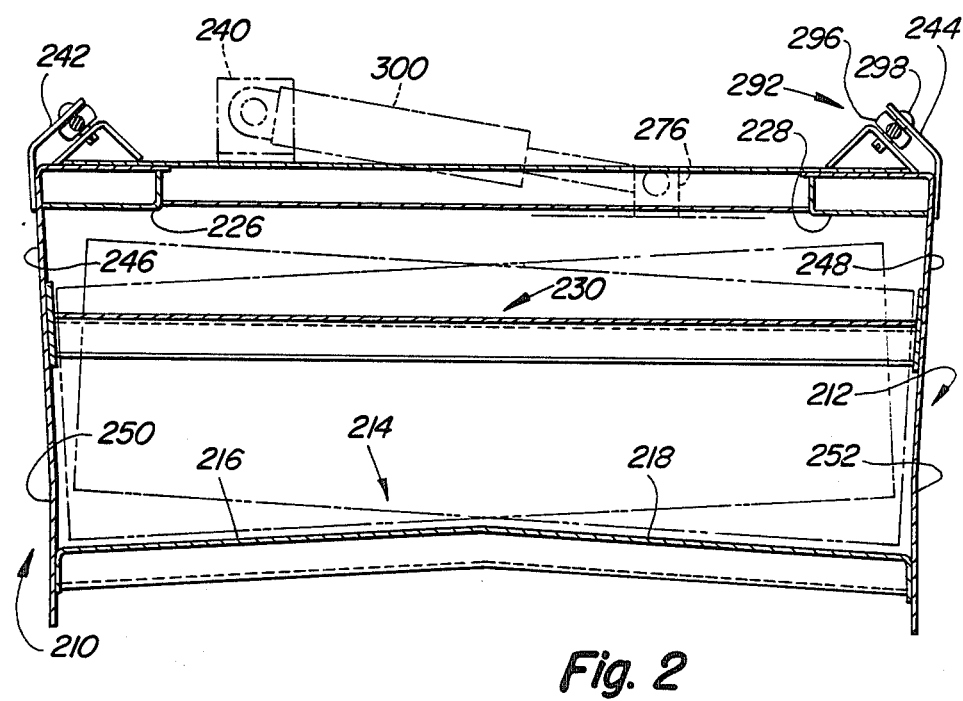
FIG. 2 is an enlarged, partial cross-sectional view of the feederhouse of the combine harvester header taken approximately on line 2—2 of FIG. 3.
Figure 3:
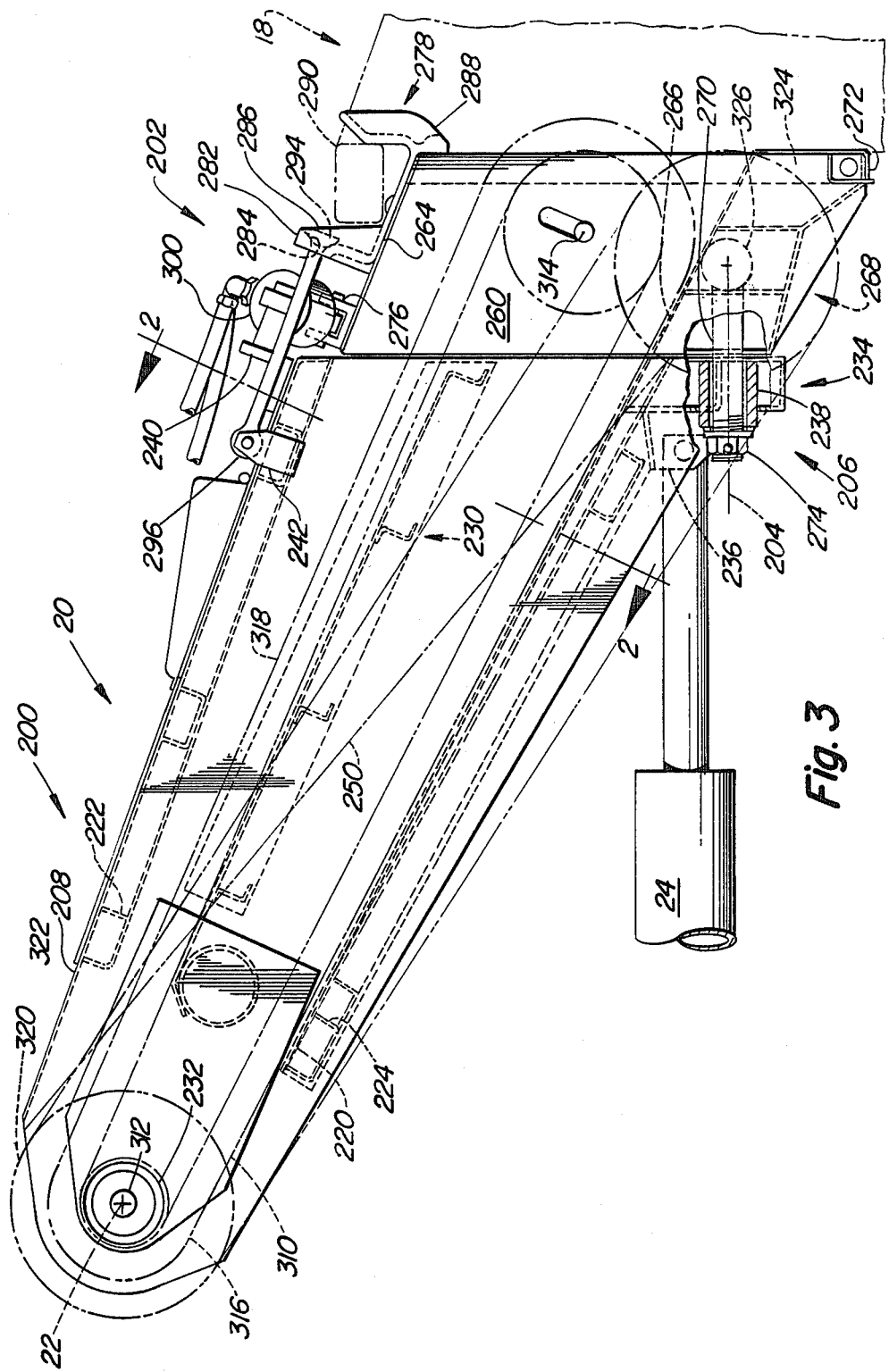
FIG. 3 is an enlarged, partial side elevation of the right-hand side of the feederhouse (and a portion of the platform of the harvester header, shown in phantom outline only).

Pertinent details of the feederhouse 20 are shown in FIGS. 2 and 3. The overall form and function of the feederhouse is largely conventional but it is divided into two portions, a major upper portion 200 and a forward portion 202 mounted so that it may rock or pivot about a generally fore-and-aft axis 204 provided by a pivot assembly 206 through a range of +3 degrees from nominal.

The top wall 208, opposite sidewalls 210, 212 and floor 214 define an upwardly and rearwardly sloping conveyor channel of generally rectangular cross section. As seen best in FIG. 2, the floor 214 is formed into a shallow ridge by right- and left-hand sloping floor portions 216, 218 tapering out at a point 220 towards the upper end of the floor so that the floor at the discharge end of the feederhouse is flat.

The top 208 and floor 214 are both reinforced by reinforcing members, such as the channel section members top and bottom 222, 224, respectively, and longitudinal corner reinforcing members right- and left-hand 226, 228, seen best in FIG. 2. A conveyor return support assembly 230 extends through much of the length of the main feederhouse body 200 somewhat towards the top 208. The feederhouse body portion 200 is pivotably attached to the combine body 10 by a pair of pivot bosses 232 on opposite sides of the body.

A body bottom frame or reinforcement 234 extends across the bottom of the feederhouse and carries a spaced apart pair of lift cylinder brackets 236 to which the lift cylinders 24 are connected. Pivot bushing 238 extends fore-and-aft in the bottom frame 234 centered beneath the feederhouse floor portion 214. A tilt cylinder bracket 240 is carried by the feederhousing top 208 close to its forward edge and offset to the right of the feederhouse centerline. Close to the forward top outer corners of the feederhouse portion 200 are a pair of opposite inclined clevis brackets 242 right-hand, 244 left-hand.

Note that the opposite upper forward portions 246, 248 of the main feederhouse sidewalls 210, 212 are inclined outwards along bend lines 250, 252, respectively, so that they are approximately perpendicular to their respective adjacent sloping floor portions 216, 218.

The feederhouse body forward portion 202 is a hollow frame of generally rectangular cross section forming a forward extension of the feederhouse conveyor channel or passage. Upright opposite right- and left-hand sidewalls 260, 262 are perpendicular to sloping top and floor 264, 266 respectively. The floor 266 forms the top member of a sturdy, transversely extending bottom frame assembly 268 which securely anchors a horizontally and rearwardly extending feederhouse pivot pin 270 and a pair of horizontally spaced platform bottom latches 272. The pivot pin 270 is free to oscillate in the pivot bushing or bearing 238 and is retained by nut and washer assembly 274.

A tilt cylinder bracket (or lug) 276 is fixed to the top 264 towards the left-hand side of the feederhouse. A pair of platform support or lift brackets 278, 280, right- and left-hand, respectively, are rigidly attached to the respective opposite top corners of the forward feederhouse body 202 in approximate fore-and-aft alignment with the corresponding clevis brackets 242, 244 of the main feederhouse body 200. The rear leg 282 of each bracket has a generally fore-and-aft extending hole and a forward-facing, approximately hemispherical socket 286 concentric with the hole. The forward portion of each bracket 288 provides a cradle for a transverse main upper frame member 290 of the platform 18. The platform is locked into position by a means of a latch arrangement (not shown) engaging the latches 272 at the bottom of the forward feederhouse body 202.

The forward overhanging load of the platform 18 is taken by a pair of tie rods 292 each having a ball end 294 for seating in the socket 286 of the lift brackets 278, 280 and a tie end 296 retained in the respective opposite clevis brackets 242, 244 by a pin 298. Rocking motion or pivoting of the feederhouse body forward portion 202 relative to the main feederhouse body 200 is controlled by a hydraulic tilt cylinder 300 connected between the tilt cylinder brackets of the two portions 276 and 240, respectively.

The feederhouse conveyor chain assembly 310, seen best in FIGS. 2 and 3, but shown only in phantom outline, is essentially conventional and of the chain and transverse slat type, trained around sprockets on upper and lower shafts 312, 314, respectively, spanning the feederhouse. But note that the lower shaft 314 is journaled in the feederhouse extension 202, in essentially fixed relation to the extension 202 so that it pivots with it. In harvesting operation, the conveyor chain's lower run 316 carries harvested crop material rearwardly and upwardly over the feederhouse floor portions 266 and 214, and in the main feederhouse body 200, at least, the return or upper run of the chain 318 is given some support by the support assembly 230.

The general arrangement of the drive system for the header is conventional. An input countershaft sheave 320, coaxial with the feederhouse conveyor shaft 312 receives power from the combine engine (not shown) and transfers it by V-belt 322 and a driven sheave 324 to the main drive shaft or backshaft 326 for the header, transversely extending through and journalled in the feederhouse forward body portion 202. From the backshaft 326, drives to the components of the header, including feederhouse conveyor chain 310, reel 32, knife 46 and platform auger 44, are essentially conventional through left- and right-hand extensions of the header backshaft 326 and coupled to the backshaft by conventional couplings (not shown).

Figure 12:
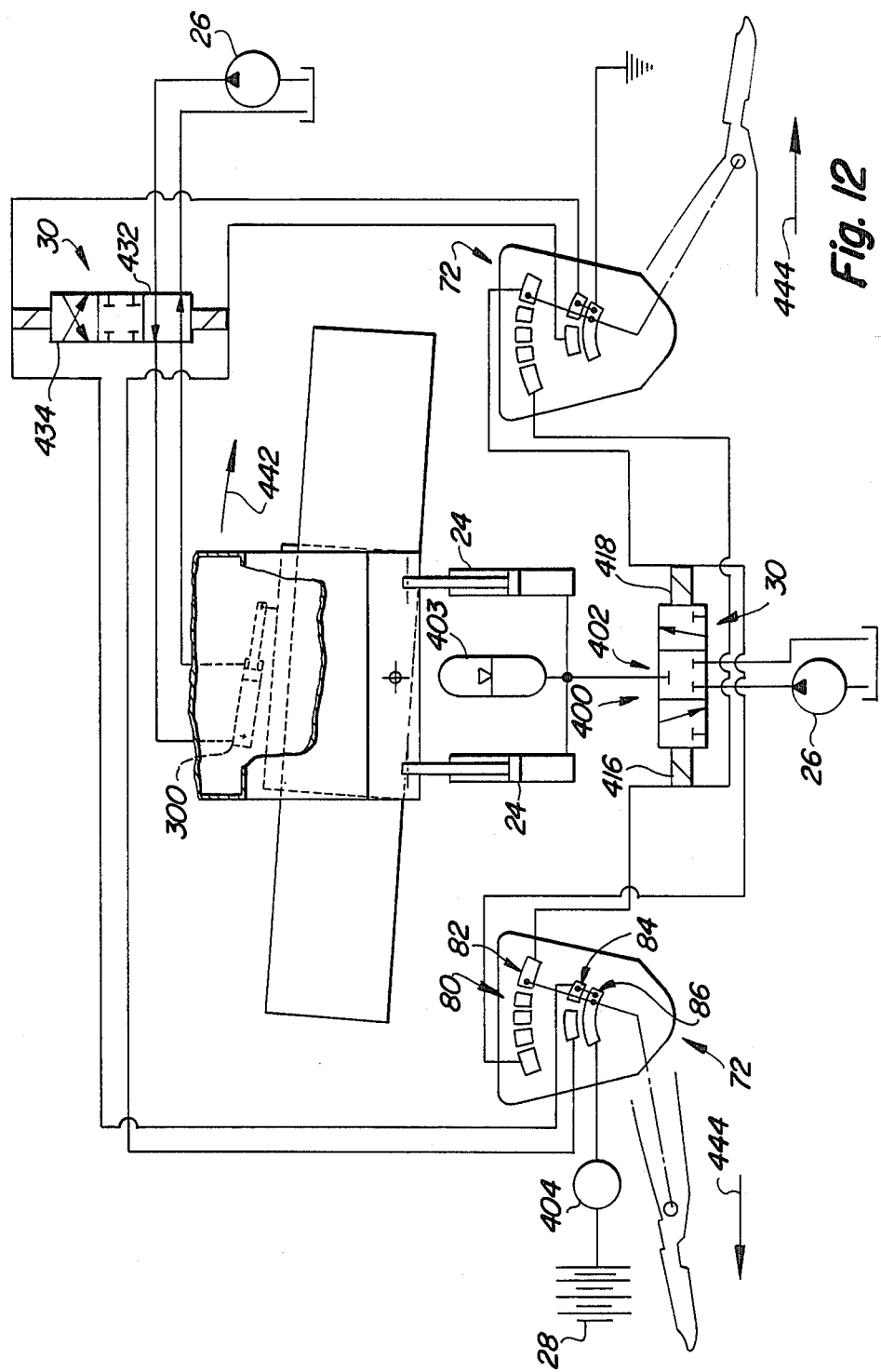
FIG. 12 is a simplified schematic of the control circuitry of the combined automatic tilt and height control system of the header, using a separate tilt cylinder as in FIGS. 1-3. Overall, the header structure is viewed from the rear, but the position sensor switches are viewed from their respective sides (left from left and right from right).

FIG. 12 represents a simplified schematic of the platform control system of the above embodiment including that portion of the combine electrical system directly related to the automatic control of the lateral attitude or tilt of the platform 18 relative to the feederhouse 20 and of the height or position of the platform responsive to the floating of the floating cutterbar 34 relative to the platform floor 38. The control system includes an electrical power source 28 and portions of the electrohydraulic control assembly 30 (see FIG. 1) comprising a raise portion 400 and a lower portion 402, each when suitably energized, causing the actuation of the hydraulic cylinders 24, respectively, to raise or lower the header 16. The support, and raising and lowering of the header 16, is "cushioned" in a well known manner by the action of an accumulator 403.

The raise and lower portions 400 and 402 of the control system are similar to those described in more detail in U.S. Pat. No. 4,332,126, Van Auwelaer, except that here, two position sensor switch modules 72 in series respond to raise and lower signals from the flexible floating cutter bar 34 to control header height within a selected float range. A portion of the control arrangement is isolated and is shown schematically in more detail in FIG. 9, particularly to illustrate the general function of the lift control portion. For simplicity, only a single position sensor switch module 72 is shown there.

Referring particularly to FIGS. 9, 10 and 11, selection of the nominal vertical float range of the flexible floating cutterbar 34 relative to the platform 38 is made from the operators station 14 by means of a conventional three-pole, four position rotary selector switch 404. Switch positions are suitably labeled by a decal indicated in FIG. 11 by the numeral 406. The switch is connected to the electrohydraulic control assembly 30 by a wiring harness 408 (FIG. 1). A second wiring harness 410 connects the electrohydraulic control assembly to the position sensor switch assemblies 72.

The raise and lower portions 400, 402 each include switching relays (412 raise and 414 lower) and solenoid valve coils (416 raise and 418 lower). As indicated in FIG. 11, the selector switch 404 provides an "off" position A and three operating positions B, C, D, each corresponding to a particular operating attitude set point of the cutter bar 46 relative to the platform floor 38. The rotary selector switch 404, shown in FIG. 9, purely schematically in "exploded" form, includes three coupled together and coaxial wiper segments 420, 422 and 424, one for each pole of the switch. The relative position of each of the wiper segments corresponding to each of the four switch positions A, B, C, D is indicated pictorially in FIG. 10 by the letters A', B', C', D'. The function performed by the switching relays 412, 414 and the solenoid valve coils 416, 418, respectively, is conventional.

The electrical function of the height or raise and lower portions of the position sensor switch assemblies 72 is also indicated only schematically in the circuit schematic of FIG. 9. The appropriate wiring connections between the terminals of the components of the system (provided at least in part by the wiring harnesses 408 and 410) are included but not specifically identified in the schematic. FIG. 9 indicates the functional correspondence of the contacts of the raise and lower output contact array 82, seen best in FIG. 8. These include committed raise and lower contacts 426 and 428, respectively, (as wired for the right-hand switch) at the opposite ends of the array and three central uncommitted contacts 430, which are connected selectively by manipulation of the rotary selector switch 404, becoming, according to the position of the switch, raise, lower or neutral contacts.

The tilt control portion of the system (seen best in FIG. 12) includes the tilt cylinder 300 and the tilt portions of the position sensor switches 72 and the generally conventional electrohydraulic control tilt-right and tilt-left portions, 432 and 434, respectively, of the electrohydraulic control assembly 30. The switch tilt contact array 84, as seen also in FIG. 8, is similar in construction to the raise/lower contacts 82 but simpler in that there are only two operating contacts 436 and 438 in the printed circuit board 78, corresponding to opposite tilt signals. In general, for lateral or tilt control of the platform, there is only one desirable set point—that is for the platform adjacent the platform knife to be generally parallel to the ground surface—so that two contacts are sufficient. But of course, a multiple contact switch might be used with suitable circuitry to provide a range of sensitivity so that the operator would have a choice, depending on operating conditions, of speed and/or precision of response in the lateral control. A multiple position tilt switch could also be used, again with suitable circuitry, to adjust the neutral or nominal lateral tilt position of the platform to compensate for some built-in structural misalignment resulting from manufacturing variations or deflection under an offset load.

The sensor shaft and switch arrangement described above provides independent "height" sensing of the right and left spans of the header. On either side, any skid shoe 52 contacting the ground and highest (in terms of rotational position of the sensor shaft 54, 55 or in relation to the platform floor 38) will determine the rotational position of its respective sensor switch 72, (see FIGS. 4 and 6)

In a suitable function logic system, the respective height and tilt contact arrays (82, 84) of each position sensor switch assembly 72 would generate corresponding function signals, essentially in unison. However, the switches may be designed to have different effective neutral or dead bands to provide desired functional characteristics. For example, a narrower dead band in the switch tilt portion would result in a priority or lead of tilt response with respect to lift response. In this exemplary embodiment, and as best seen in FIG. 8, a neutral tilt signal position (tilt brush assembly 90 centered in the space 440 between the tilt contacts 436, 438) corresponds to a neutral height control signal (height control brush assembly 88, centered on the center uncommitted contact 430) assuming the rotary selector switch 404 is set at operating position C (the intermediate operating range). It can be seen that upon rotation of the wiper arm assembly 80, responsive to movement of a ground contacting sensor shoe 52, a tilt signal condition would be reached before the height control brush assembly 88 moved to an adjacent live height control contact 430.

Note that in the switch contact arrangement of this exemplary embodiment, and illustrated in FIG. 8, priority of tilt response over height control response would be obtained only with the rotary selector switch 404 in the center operating position (position C). Clearly, any desired combination of priority in operating characteristic could be obtained with suitable combinations of contact dimension and spacing of the height control with respect to the tilt control contacts, with or without the additional sophistication of a multiple array of tilt contacts. In the latter case, a single rotary selector switch might be used or connected so that dead or neutral bands of both height control and tilt contact arrays are always in unison.

Figure 6:
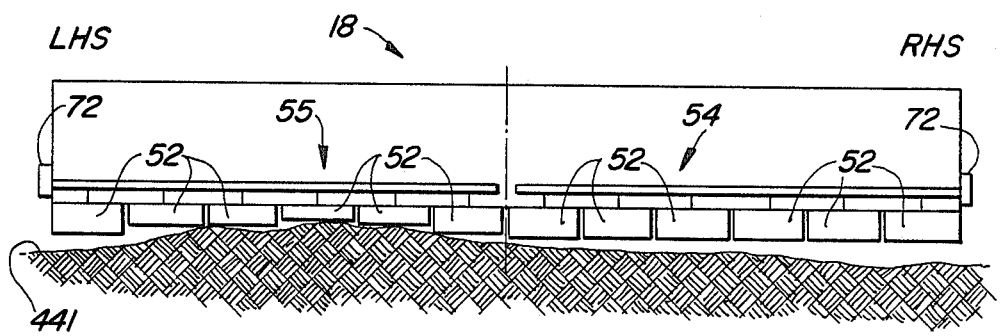
FIG. 6 is a simplified semi-schematic rear view of the header platform indicating the general arrangement and relation of the ground engaging skid shoes or feelers, their sensor shaft assemblies and the position sensor switches.

In the control condition represented in FIG. 12 and shown diagramatically in FIG. 6, one or more of the skid shoes 52 of the left-hand side of the platform are in contact with the ground 441 and at least one of them has been elevated sufficiently to generate a "tilt right" signal at the left-hand position sensor switch 72. The terrain at the right-hand side of the platform falls away so that there is an opposite signal from the right-hand position sensor switch 72 and the result is electrohydraulic actuation to tilt the platform to the right, as indicated in FIG. 12, by numeral 442. As also indicated in FIG. 12, in this exemplary condition of the control system, the sensor switch height control contacts are also closed (raise left, lower right). However, the sense of the series connection of the switch height control contact arrays is such that no height control actuation results from these opposite or unlike signals. Note that in FIG. 12 (and also in FIG. 13, to be described below) the sensor switches 72 are shown in side view from opposite sides of the platform 18 and relevant travel direction is referenced by arrows 444.

The control logic of the embodiment of FIG. 12 is apparent from the figure itself. For given signal directions, both the height control contacts and tilt control contacts are connected in series so that signals must be received from both sides of the platform before actuation occurs. (The embodiment illustrated by FIG. 16 and described below does not require this). Identical position sensor switches 72 are used on the respective ends of the respective sensor shaft assemblies 54 and 55. Note, however, that wiring of the height control contact arrays must be such that the committed raise contacts 426 remain towards the rear of the machine.

In operation, before advancing into a field of standing crop, the operator will have set the rotary height control selector switch 404 at the operator station 14 for a given nominal float position of the floating cutterbar 34. Then by means of conventional and well known control elements and circuitry, not shown or described here, he will lower the header 16 "manually" into the height range where one or more of the ground-engaging shoes 52 of the floating cutterbar 34 may contact the ground and the system becomes subjectible to automatic height and tilt control. On releasing the manual lift control switch or lever, the automatic system takes over. In the position sensor switch assemblies 72, the wiper arm assemblies 80 directly coupled to the position sensing rockshaft assemblies 54, 55 respond to the relative float positions of the left- and right-hand portions of floating cutterbar to move the brush assemblies 89, 90 in relation to the contact arrays 82, 84 of the printed circuit boards 78, sending signals to actuate height and tilt control systems to raise or lower the header as required to maintain the selected operating float position of the floating cutterbar and with the platform parallel to the ground. (Note that in response to a control signal, tilting in either direction is "positive" because a double acting cylinder 300 is used. But use of single acting lift cylinders 24 mean that while lifting is "positive", lowering is "passive", depending on the weight of the header 16 to expel oil from the cylinders).

As long as the terrain or field surface conditions encountered by the skid shoes 52 are such that the left- and right-hand position sensor switches work in unison, behavior of the lift control system is essentially conventional, the platform being raised and lowered with no change in lateral tilt position. When changing terrain results in a "discrepancy" of signal between the left- and right-hand position sensor switches (as indicated in FIG. 6, for example) the lateral tilt control system is activated and the platform is laterally controlled through actuation of the tilt cylinder 300 pivoting the platform assembly relative to the fixed feederhouse portion 200 about the pivot axis 204.

As described above, the control system of FIG. 12 requires an active or "change" signal from both sides of the platform before the lift or tilt actuators are energized. The signals may be of the same sense or opposite. In typical operation, terrain variations will result in this necessary "dual" signalling so that thessystem is adequately responsive. However, if one side of the platform encounters higher ground, signalling lift and tilt, while the other side is in "neutral", there will be (potentially) no immediate lift or tilt cylinder actuation. But, assisted by accumulator 403, suitably charged, the platform, riding on skid shoes 52, may float upwards without tilting and so generate a "lower" signal from the opposite side, and hence, a tilt actuation. A similar but generally opposite response applies when a sudden depression is encountered on one side of the platform.

Clearly, the control system described here may result in actuation of the height control side of the system, either manually or automatically, to raise or lower the header with the platform in a tilted condition. But when the platform is next lowered into a ground contact, automatic corrective tilt control would immediately be effective. However, it may be desirable to provide, in the control system, means for automatically levelling the platform (that is return to a predetermined neutral position) when it is raised from the harvesting operation range into transport position.

The feederhouse structure and drive arrangement for the header described above result in a number of advantages. Extending the feederhouse conveyor chain 310 down into the feederhouse extension (feederhouse body forward portion 202), with the conveyor lower shaft 314 journaled in the extension 202 as shown in FIG. 3, maintains the conventional close crop material transfer relationship between the conventional platform auger and the feederhouse conveyor so that no additional conveying means, such as an intermediate beater, is required.

No special provisions are required in the drive system to compensate for pivoting of the platform relative to the feederhouse. There is relative motion in the drive system only in the input V-belt drive (sheaves 320, 324 and V-belt 322) and, similarly, in the feederhouse conveyor chain drive from the backshaft 326 up to the upper shaft 312, but given that the rocking of the platform relative to the feederhouse is no more (than 3 degrees, the changes in alignment and position in these drives is negligible or readily tolerated.

Efficiency of crop material feeding is maintained because at the critical material receiving point in the lower feederhouse, there is a fixed relationship between the conveyor chain lower conveying run 316 and the feederhouse floor (floor portion 266). The arrangement, of course, does result in some nominal variation of clearance between the conveyor chain and the main feederhouse floor 214 as the platform tilts. However, the ridged arrangement of floor, seen best in FIG. 2 (floor portions 216, 218) minimizes the effect. Also the "flared" feederhouse wall (upper forward wall portions 246, 248) configuration helps to keep clearances between the conveyor chain and the feederhouse walls to a minimum so as to minimize any effect on conveying efficiency.

The main platform to feederhouse pivot (pivot assembly 206) is stabilized by the upper swivel arrangement in which tie rods 292 are long enough so that the small allowable range of oscillation between the platform and the feederhouse results in only minor changes in the effective length of the ie rods so that a predetermined clearance between the main feederhouse body and feederhouse extension body is essentially maintained. The inclined pivot axis provided for the upper end of the eye bolt by the clevis brackets 242 and 244 and the ball and socket arrangement (294, 286) at the opposite end of the tie rods 292 minimizes induced stresses in the rods and the related feederhouse portions to which they are connected.

This first embodiment also has the advantage that it requires no modification of the platform, including its drive system.

Figure 14:
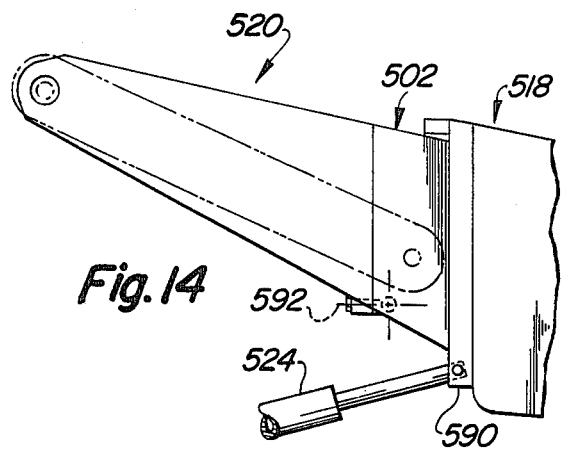
FIG. 14 is a right-hand, much simplified partial right-hand side elevation of an alternative embodiment of the invention in which the lift cylinders are connected to the pivotable portion of the header and are differentially controlled to provide tilt control.
Figure 15:
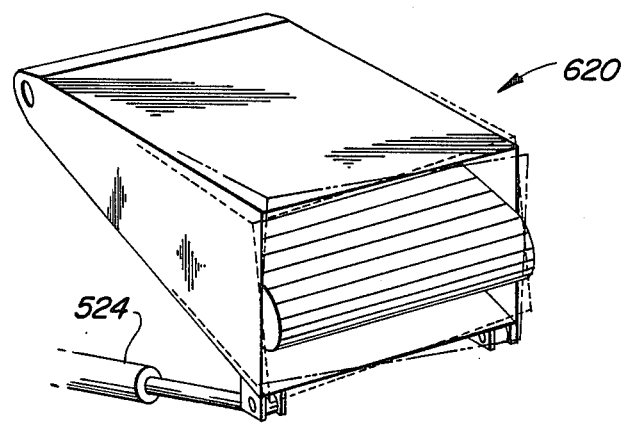
FIG. 15 is a simplified perspective view of the feederhouse of an alternative embodiment of the invention (front right-hand three-quarter view) in which the lift cylinders are differentially controlled to provide tilt control and pivoting of the header platform depends on torsional flexibility of the feederhouse.
Figure 13:
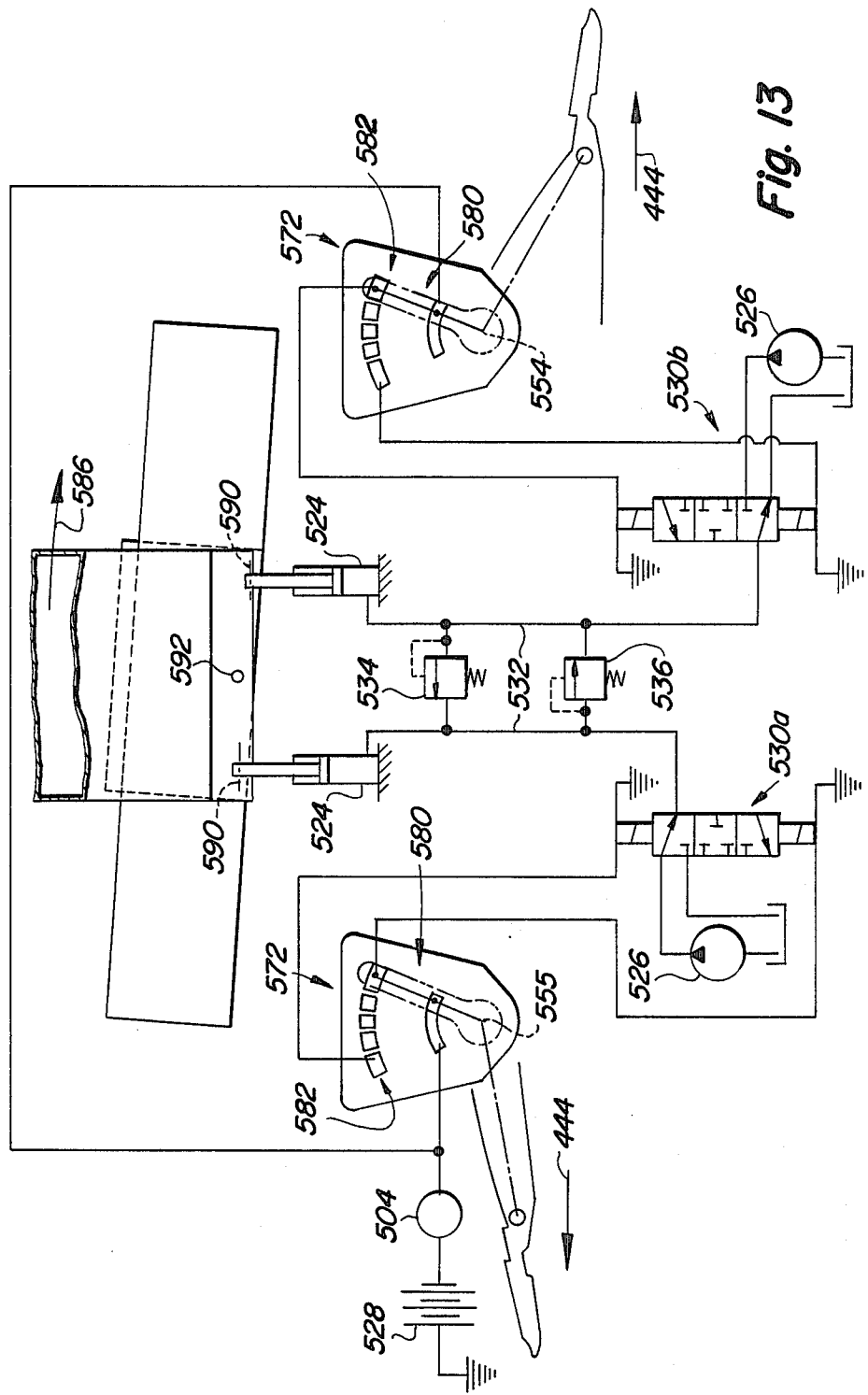
FIG. 13 is similar to FIG. 12 but represents the control circuitry of the alternative embodiments of FIGS. 14 and 15.

The alternative embodiments of FIGS. 14 and 15 are similar to one another in that the specific tilt cylinder (300) has been eliminated and tilt control relies on differential actuation of the laterally spaced lift cylinders 524. The control function logic, apparent from FIG. 13, provides that the system is responsive to signals from either side so that the respective cylinders may be actuated independently, or simultaneously, in unison or in opposition. The electrohydraulic control system is thus simpler than that of the first embodiment, especially if equal degrees of sensitivity for both the tilt and the height control systems are acceptable. A pair of identical sensor switch assemblies 572, each with only a single output contact array 582 may be used. If selective operating height control is desired, multiple contact switches of the type disclosed in U.S. Pat. No. 4,332,126 (Van Auwelaer) may be used, as indicated in FIG. 13.

The embodiments of FIGS. 14 and 15 may both use the control system shown schematically in FIG. 13. Both tilt and height control functions are controlled by the signals from the single output contact array 582 of the switches 572. Selection of nominal operating position of the flexible floating cutterbar 34 relative to the platform floor 38 is made at the operator's station by rotary selector switch 504. Tilt and height control actuation is effected by a pair of symmetrically, laterally spaced single acting cylinders 524. Hydraulic and electrical power are supplied by sources on the combine 526 and 528, respectively. Flow of hydraulic fluid to and from the actuators 524 is controlled by a pair of left and right-hand electrohydraulic control assemblies 530a and 530b, respectively, by way of functionally parallel fluid lines 532. Communication between these two lines 532 is possible in either direction by pressure-compensated relief valves 534, 536.

The function of the flexible floating cutterbar 34 is, as described above, with ground contacting shoes 52, responding to ground contact to "drive" right- and left-hand sensor shaft assemblies 554, 555, respectively and hence, position wiper arm assembly 580 with respect to the output contact arrays 582, according to the relative height above the adjacent ground of the corresponding portion of the fixed platform floor 38.

As indicated in the control schematic of FIG. 13, the two-cylinder system is simpler in that there are only separate "lift" (raise and lower) modes of control for each cylinder and no separate tilt control (or cylinder) per se. The individual left and right lift cylinders 524 are responsive only to their corresponding position sensor switches 572 which actuate the cylinder in response to switch signals according to the logic table below.

The possible signal combinations and resultant action are as follows:

| Signal | | |
| --- | --- | --- |
| Left Side | Right Side | Resultant Action |
| Lower | None | Tilt - left |
| None | Raise | Tilt - left |
| Lower | Raise | Tilt - left |
| Raise | None | Tilt - right |
| None | Lower | Tilt - right |
| Raise | Lower | Tilt - right |
| Lower | Lower | Lower |

-continued

| Signal | | Resultant Action |
|---|---|---|
| Left Side | Right Side | |
| Raise | Raise | Raise |

The control condition illustrated in FIG. 13 is the same as that in FIG. 12—the left-hand position sensor switch 572 is signalling "raise" for the left-hand side and "lower" for the right-hand side of the platform. Consequently, the system is activated to extend the left-hand cylinder and to allow the right-hand cylinder to retract, as the unbalanced weight of the platform expels oil from the cylinder, tilting the platform to the right, as indicated by arrow 586.

In the embodiments of FIGS. 14 and 15, with a control system as in FIG. 13, a sensor signal from only one side of the platform causes a tilt response, but actuates only one of the lift cylinders 524. The connecting point 590 of the inactive cylinder becomes, effectively, a fixed pivot point for the platform relative to the combine body. In the embodiment of FIG. 14, the platform 18 will, of course, continue to pivot relative to the feederhouse 20 about pivot 592 which, along with the feederhouse, will rise or fall slightly during single cylinder operation.

In the embodiment of FIG. 14, the platform 518 and feederhouse 520 structures are similar to those described above for FIGS. 1, 2 and 3 except that there is, of course, no need for tilt cylinder brackets and the feederhouse extension 502 now includes brackets 590 for direct attachment of the lift cylinders 524. In this embodiment, the functional characteristics and advantages with respect to crop material handling, including transfer from the platform to the feederhouse and in drive simplicity, remain as described above for the embodiment of FIGS. 1–3.

In the embodiment of FIG. 15, also a "two cylinder" system, accommodation of lateral tilting between the platform and the combine body is provided entirely by a torsionally flexible feederhouse 620. Thus the form of the feederhouse and platform and drive arrangements may be conventional—that is similar to a combine in which no provision is made for lateral tilt between platform and combine body. The structure of the feederhouse need only be modified to provide the required degree of flexibility. The lift cylinders are shown pivotably attached to the feederhouse, but in keeping with the invention, they could be attached to the platform (not shown), possibly to a frame structure associated with the coupling of the platform to the feederhouse. This would make it possible to increase the lateral spread of the cylinders for greater stability and improved response in the control of the platform.

In lateral control systems which rely entirely on the "lift" cylnders, (FIGS. 14 and 15), it may be desirable to effectively lower the points of attachment of the cylinders to the combine frame. This would increase the slope of the line of action of the cylinders and provide more efficient force distribution and a more direct line of action with respect to the effective pivot axes of the platform (pivot axis 592 or the "opposite" bracket 590 if only one cylinder 524 is active—see FIG. 14) with respect to the combine body. Alternatively, or in addition, in the embodiment of FIG. 14, the interface of the main feederhouse 520 and the tilt frame 502 may be inclined forward so that the pivot axis 592 slopes downwardly, again resulting in a more favorable mechanical advantage for the cylinders 524 with respect to tilt control of the platform 518.

Figure 16:
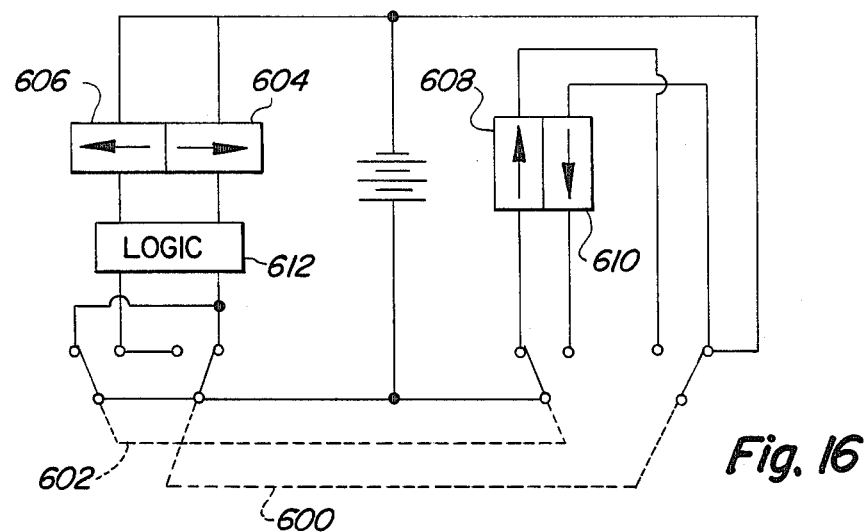
FIG. 16 illustrates, schematically, alternative control circuitry for the embodiment shown in FIGS. 1-3.

In a fourth embodiment, indicated purely schematically by the control diagram of FIG. 16, the structure may be that shown in FIGS. 1 to 3, that is, with the platform carried for lateral pivoting with respect to a feederhouse with pivoting controlled by a tilt cylinder and the elevation of the feederhouse controlled by a pair of lift cylinders working in unison. The electrohydraulic control components and structure of the switches may be also as in the first embodiment. As indicated by FIG. 16, this fourth embodiment differs from the first principally in that the tilt control contacts of the right- and left-hand sensor switches 600, 602, respectively, are connected in parallel with the right and left tilt actuator systems 604, 606, respectively. The signal or control condition illustrated in FIG. 16 (as in FIGS. 12 and 13) is left-hand-raise, right-hand-lower. As in the first embodiment, the raise and lower actuator systems 608, 610, respectively, are connected in series with the raise and lower contacts of the respective switches. The logic circuit 612 connected between the switches 600, 602 and the tilt actuator portions 604, 606 inactivates the tilt system when raise signals are received from both sides of the header which would otherwise be sensed as conflicting tilt signals. The possible signal combinations and resultant action for this embodiment are the same as for the two cylinder systems of FIGS. 14 and 15, as determined by the control arrangement of FIG. 13 and as tabulated above. These systems differ from that exemplified by FIG. 12 in that they respond (with a tilt actuation) to a signal from one side of the header only.

The "cross over" relief valves 534, 536, shown in FIG. 13 and applying to the two cylinder embodiments of FIGS. 14 and 15, are designed to function at the limits of the tilt range. As explained above, tilting of the platform relative to the feederhouse is limited to about plus or minus 3 degrees from a nominal position by suitable stops (not shown in the drawings). If the terrain is such that the sensor system continues to call for tilt after the tilt limit has been reached, the respective or appropriate relief valve opens, allowing fluid pressure to be applied to both cylinders, thus raising the platform.

We claim:

1. In a harvester having a mobile body carrying a forward mounted header, vertically adjustable by a pair of laterally spaced hydraulic lift cylinders connected between the body and the header, and a drive system for transmitting power between the body and the components of the header, an improved feederhouse for the header, pivotably connected to the mobile body adjacent its rearward end and supporting at its forward end a laterally extending elongated gatherer comprising:

a casing defining a generally rearwardly and upwardly extending feeding channel having a foward inlet and a rearward outlet communicating with the mobile body;

a generally upright connector frame substantially registering with and surrounding the inlet, supported by the feederhouse casing for oscillating motion with respect to the casing in a generally upright plane, and having a forward face with means for receiving and supporting the gatherer;

a feederhouse conveyor extending within the feederhouse casing and having a forward receiving end supported by the connector frame and a rearward end supported by the feederhouse casing; and means for controlling the oscillation of the connecting frame and hence of the gatherer with respect to the feederhouse casing.

2. The feederhouse of claim 1 and further including a laterally extending transfer drive countershaft carried by the connector frame for receiving power from the mobile body and transmitting it to components of the header.

3. The feederhouse of claim 1 wherein the feederhouse casing includes a rearwardly and upwardly sloping floor having outer edges and wherein the feederhouse conveyor is of the endless belt type having a lower run disposed to pass, rearwardly and upwardly closely above the floor and wherein a central forward lower portion of the floor is crowned upwards with respect to the outer edges.

4. The feederhouse of claim 1 wherein the means for connecting the connecting frame to the feederhouse casing includes a pivot disposed in a lower portion of the connecting frame for permitting oscillation of the frame about a generally fore-and-aft axis.

5. The feederhouse of claim 4 wherein the means for connecting the connecting frame to the feederhouse casing further includes at least one elongated radius rod extending generally fore-and-aft and having opposite ends respectively connected to the feederhouse casing and to the connecting frame so as to permit lateral displacement between the feederhouse casing and the upper portions of the connecting frame.

6. The feederhouse of claim 1 wherein the means for controlling oscillation of the connecting frame with respect to the feederhouse casing includes a powered linear actuator connected between the feederhouse casing and the connecting frame.

7. The feederhouse of claim 1 wherein the connecting frame is attached to the feeder house casing for oscillation about a generally fore-and-aft pivot axis centrally disposed in a lower portion of the connecting frame, said lower portion of the connecting frame including a pair of laterally spaced connecting means straddling the connecting frame pivot axis, each for receiving an end of one of the respective lift cylinders and whereby the relative extension of the respective lift cylinders controls the oscillation of the connecting frame with respect to the feeder house casing.

8. In a harvester including a mobile body and a forward mounted header carried by the body and including a laterally extending gatherer supported for oscillation in a generally upright transverse plane, the header being vertically adjustable with respect to the mobile body about a transverse axis, a control system for automatically controlling the height of the gatherers above the ground and the oscillation of the gatherer comprising:

power means including at least one actuator, connected between the mobile body and the header and operable to raise or lower the header, pivoting about the transverse pivot axis, and operable to displace the gathereer with respect to the mobile body within the upright plane;

independent left- and right-hand laterally extending arrays of sensors carried by and substantially spanning the gatherer, at least one sensor array including a sensor disposed approximately midway between the opposite lateral extremities of the gatherer, each sensor being associated with a laterally distinct portion of the gatherer and operable to generate a sensor signal related to the relative height of that gatherer portion above the ground; and control means including logic systems responsive to the sensor signals and operable to control the power means so as to seek to maintain all portions of the gatherer at a predetermined height above the ground.

9. The control system of claim 8 wherein in each sensor array, the sensors are operably interconnected and the logic system is such that the power means are operable to lower a gatherer portion, in the event of a plurality of lower signals, only in respons to the sensor associated with the gatherer portion closest to the ground.

10. The control system of claim 9 wherein the left- and right-hand sensor arrays each include laterally extending shafts, each shaft being biasable by any one of the ground-engaging sensors of its respective array and wherein each shaft is drivably connected to a position sensor switch for providing the logic input to the control system.

11. In a harvester having a mobile body supporting a forward mounted, vertically adjustable header, the header including a feederhouse attached to the mobile body for pivoting about a transverse axis and having a forward connecting face for receiving and holding in fixed relation to said face, a laterally extending elongated gatherer, and the feederhouse including a generally tubular casing, a gatherer position control arrangement characterized in that:

the connecting face of the feederhouse is generally rotatably deflectable relative to the combine body in an approximately upright plane;

the gatherer includes spaced apart left- and right-hand ground-engaging sensor assemblies for sensing the relative height of respective left- and right-hand portions of the gatherer above the ground;

it includes laterally spaced left- and right-hand hydraulic lift cylinders connected between the body and adjacent the connecting face of the feederhouse, hydraulically adjustable to control the height of the header, pivoting about the transverse axis, and the rotatable position of the gatherer relative to the combine body; and in that it includes automatic control means responsive to movement of the sensors relative to the gatherer portion to effect independent changes in the lengths of the respective left- and right-hand cylinders so as to seek to maintain the gatherer parallel to and at a preselected height above the ground.

12. The gatherer position control arrangement of claim 11 further characterized in that the feederhouse casing includes a forward extension pivotably carried by the feederhouse casing for pivoting about a generally fore-and-aft axis and having a forward face constituting said connecting face and in that the spaced-apart hydraulic cylinders are pivotably connected at spaced-apart points in a lower portion of the extension.

13. The gatherer position control arrangement of claim 12 further characterized in that the fore-and-aft pivot axis effective between the feederhouse casing extension and the feederhouse casing is disposed adjacent a lower central portion of the extension.

14. The gatherer position control arrangement of claim 13 further characterized in that the pivot axis approximately intersects a line joining the points of attachment of the lift cylinders to the extension.

15. The gatherer position control arrangement of claim 11 further characterized in that the feederhouse casing is torsionally deflectable and wherein, in terms of displacement in an upright plane, the rearward end of the feederhouse casing is held non-rotatably by the harvester mobile body and the header lift cylinders are connected relatively forward on the feederhouse body so that, responsive to the independent length control of the cylinders, the forward connecting face of the feederhouse is rotationally deflectable so as to provide the necessary movement in the upright plane for automatic control of the gatherer with respect to the ground.

16. The gatherer position control arrangement of claim 11 further characterized in including a hydraulic line connecting the lift cylinders and a normally closed relief valve in said line operable to open at a predetermined hydraulic pressure so as to permit communication between the cylinders and in including stop means for limiting the rotational deflection of the feederhouse connecting face.

17. In a harvester including a mobile body and a forward mounted header carried by the body and including a laterally extending gatherer supported for oscillation in a generally upright transverse plane, the header being vertically adjustable with respect to the mobile body about a transverse axis, a control system for automatically maintaining the gatherer parallel to the ground and at a selected operating height above it, comprising:

power means connected between the mobile body and the header, operable to raise or lower the header, the header pivoting about the transverse axis for vertical adjustment, and operable to oscillate the gatehere with respect to the mobile body within the upright transverse plane; right- and left-hand sensors carried by right- and left-hand protions respectively of the gatherer, and including a sensor in at least one of said portions disposed approximately midway between the opposite lateral extremities of the gatherer, each generating an output representative of the height of the respective gatherer portion above the ground relative to the selected operating height; and control means including right- and left-hand sensor swithes responsive to the respective right- and left-hand sensors and operable to receive the sensor outputs and transduce them to raise or lower signals or no signal at each switch and connected to the power means and wherein said control means, responsive only to said raise and lower signals, activates the power means to control both the vertical adjustment of the header and the oscillation of the gatherer.

18. The control system of claim 17 wherein the oscillation the gatherer of the upright transverse plane defines an effective oscillation pivot axis and wherein the power means includes a pair of linear actuators, one on each opposite side of the effective oscillation pivot axis, and wherein each of the respective left- and right-hand sensor switches is operatively associated exclusively with the respective linear actuator on its side so that the actuators are controlled independently.

19. The control system of claim 17 wherein the oscillation of the gatherer in the upright transverse plane defines an effective pivot axis and wherein the power means includes a lift actuator portion for controlling the height of the gatherer above the ground and a tilt actuator portion operable to oscillate the gatherer in the upright transverse plane and wherein the sensor respective right-and-left-hand switches are connected in series with the lift actuator portion so that raise or lower signals are required from both right- and left-hand sides of the gatherer before the lift actuator portion is energized.

20. The control system of claim 10 wherein the sensor switches are connected in series to the tilt actuator portion so that a combination of unlike signals from the respective sides of the platforms is required before the tilt actuator portion is energized.

21. The control system of claim 20 wherein the lift actuator portion of the power means includes a hydraulic accumulator for providing a resilience in the support of the header.

22. The control system of claim 19 wherein the sensor switches are connected in parallel to the tilt actuator portion of the power means and further including a logic circuit connected between the sensor switches and the tilt actuator position so that the tilt actuator portion is not responsive to like signals from the sensor switches but is responsive to combined unlike signals or to signals from either switch independently.

23. The control system of claim 17 wherein each sensor switch includes two sets of output contacts, one set each for the lift and tilt actuators portions, respectively, and wherein connections of the switches are such that the lift actuator portion is energized only in response to a pair of like signals from the sensor switches and the tilt acutator portion is engergized in response to at least one sensor switch signal.

24. The control system of claim 22 wherein the respective lift and tilt output contacts of the sensor switches each include a pair of contacts separated by a dead band having an effective width and wherein the respective effective widths are unequal.

25. The control system of claim 24 wherein the effective width of the tilt contacts dead band is narrower than the effective width of the lift contacts dead band.

26. The control system of claim 23 wherein at least one of the sets of sensor switch contacts includes a plurality of contacts corresponding to a range of movement of the sensors and wherein the contacts are selectively connectible to the power means so as to provide a range of set points for the operation of at least one of the actuator portions.

* * * * *

UNITED STATES PATENT AND TRADEMARK OFFICE
CERTIFICATE OF CORRECTION

PATENT NO. : 4,776,153

DATED : 11 October 1988

INVENTOR(S) : Richard A. DePauw et al

It is certified that error appears in the above-identified patent and that said Letters Patent is hereby corrected as shown below:

Column 17, line 15, after "pass" delete ","; same line, after "upwardly" insert --,--; line 54, delete "gatherers" and insert --gatherer--; line 61, delete "gathereer" and insert --gatherer--.

Column 19, line 36, delete "gatehere" and insert --gatherer--; line 47, delete "swithes" and insert --switches--.

Column 20, line 12, delete "sensor"; line 13, after "right-and-left-hand", insert --sensor--; line 18, delete "10" and insert --19--; line 43, delete "22" and insert --23--.

Signed and Sealed this

Twelfth Day of September, 1989

Attest:

DONALD J. QUIGG

Attesting Officer

Commissioner of Patents and Trademarks